United States Patent Office 3,317,331
Patented May 2, 1967

3,317,331
MODIFIED AZO PIGMENTS
Maurice Auguste Jacques Lenoir, Paris, Jean Denis Bernard Ligot, Arnouville-les-Gonesse, and Madeleine Georgette Maigrot, nee Morisot, Paris, France, assignors to Etablissements Kuhlmann, Paris, France
No Drawing. Filed June 17, 1963, Ser. No. 288,536
Claims priority, application France, Sept. 18, 1962, 909,721
1 Claim. (Cl. 106—288)

The present invention concerns new pigmentary compositions and products for their preparation.

It is customary to incorporate colophony, either in the form of free acid or in the form of water-insoluble salts, principally barium or calcium salts, into pigments. This incorporation increases the transparency of the pigments and often their gloss. It also enables their tendency to bronzing to be resisted and sometimes the specular brilliance of printing inks containing these pigments to be increased. The salts of colophony and of modified rosins, with zirconium, aluminium and a few other metals, which salts were the subject of French Patents Nos. 1,226,652 and 1,246,922 are remarkably effective for making dull pigments glossy and for destroying the bronzing. In a general way, the incorporation of a colophony or of its metal salts represents a covering of the pigment particles; it acts as a surface treatment. It has been found that bronzing of pigments can be abolished and they can be made glossy by mixing them with azo compounds derived from rosinamides.

By "rosinamides" are meant the amides prepared from rosinamines which are themselves obtained by hydrogenation of the nitrile of colophony. Rosinamides which can be coupled form the subject of pending United States patent application Ser. No. 288,543 filed to-day and claiming the priority French patent application No. 901,313 namely June 20, 1962, and now abandoned. These are especially the N-acetylacetylated derivatives of rosinamines, such as that of Formula I; the condensation products of 2-hydroxy-3-naphthoic acid with rosinamines, such as that of Formula II, and the condensation products of 1-phenyl-3-carboxypyrazolone with rosinamines, such as that of Formula III.

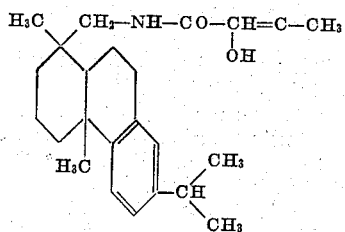

(I)

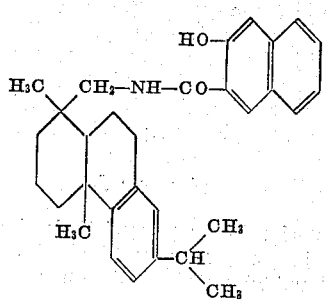

(II)

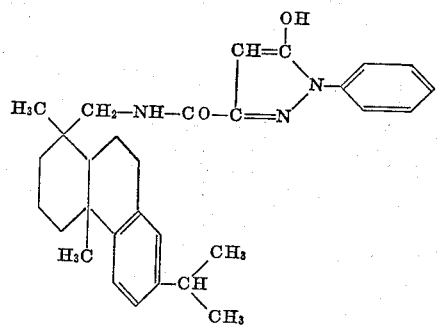

(III)

The azo derivatives of rosinamides of the invention may be prepared according to the usual methods by coupling rosinamides which are capable of being coupled with the diazo derivatives of amines. They may be represented by the formula A—N=N—X—CO—HN—R in which A represents the residue of an amine, R represents the residue of a rosinamine and X represents a member selected from the group consisting of aliphatic, aromatic and heterocyclic radicals carrying a member selected from the group consisting of phenolic and enolic hydroxyl groups and having a coupling position on a carbon atom selected from that adjacent to the carbon atom carrying the hydroxyl group and, in the case where X is an aromatic radical, in the para position to the hydroxyl group.

The mixtures of the invention may be prepared by the addition of the azo derivatives of rosinamides to the pigments to be modified. When the latter are azo pigments better results are generally obtained if a diazo compound is coupled with a mixture of coupling compounds one of which is a rosinamide. The pigments thus modified are mixtures which contain, beside basic pigmentary azo compounds, a certain proportion of an azo compound having the same diazo component and of which the coupling compound is a rosinamide. In the case where the diazotisation component is diamine which is tetrazotised, the mixture of azo compounds obtained contains an asymmetric diazo compound resulting from the coupling of a molecule of the tetrazo derivative with a molecule of the principal coupling component, on the one hand, and a molecule of rosinamide on the other hand.

Without being strictly defined, the degree of modification or the molecular proportion of the principal coupling component replaced by a rosinamide is preferably between 5% and 15%. In general, the properties of the pigment are improved without the shade and the colouring power being appreciably affected, provided the rosinamide is judiciously chosen. To this end, for example, an N-(acetylacetyl)-rosinamine of type I is preferably used for yellow pigments and an N-(2-hydroxy-3-naphthoyl)-rosinamine of type II for red pigments. But of course, if a modification of the shade is accepted or even sought after, there is no objection to the use of an N-(acetylacetyl)-rosinamine in a red pigment or an N-(2-hydroxy-3-naphthoyl)-rosinamine in a yellow pigment. It is likewise possible to use mixtures of rosinamides.

The pigmentary mixtures according to the invention have the advantage over corresponding unmodified pigments of a gloss all the higher and of a bronzing all the more reduced as the degree of modification is higher. In order to make the bronzing of pigments which are relatively brilliant by nature disappear a degree of modification of the order of 5% is often sufficient. Certain pigments called "powderings," when they are used in typographic or offset inks, lead to very dull prints on which a coming to the surface of pigment particles can be observed, which is revealed by lightly rubbing with the finger. With such pigments, an amount of modification of at least 10% is necessary in order to obtain an appreciable gloss.

In certain cases, and particularly with the most powdery or the most bronzed pigments, the pigment mixtures according to the present invention can be treated in addition according to the processes described in French Patents Nos. 1,226,652, 1,246,922 and 1,253,937. When used in typographic or offset inks, the modified pigments which have received this complementary surface treatment lead to prints of a specular brilliance higher than the corresponding unmodified pigments to which the treatment is applied. Nevertheless, this complementary treatment is not necessary in many cases, the process of the present invention itself ensuring sufficient gloss.

The rosinamides which are used in the following examples have been prepared by the processes described in the above-mentioned pending patent application. In certain cases there is the advantage that the N-(actylacetyl)-rosinamine is prepared extemporaneously by the action of diketene on rosinamine in aqueous solution in the form of the acetate, as indicated in the above-mentioned patent application. The amide is thus obtained in the form of a milky emulsion directly utilisable for the coupling.

The following examples illustrate the present invention without limiting it. The parts therein are parts by weight, unless the contrary is indicated.

*Example 1*

152 parts of 3-nitro-4-amino-toluene are diazotized in an aqueous medium in the usual manner, with 90 parts of hydrochloric acid and 70 parts of sodium nitrite. This solution of the diazo derivative is made up to 2000 parts by volume, at a temperature of 0° C., by the addition of iced water.

On the other hand, the two following solutions are prepared:

Solution A.—160 parts of N-acetylacetaniline dissolved in 2000 parts of water with 37 parts of sodium hydroxide and 2 parts of a polyethoxylated dodecyl alcohol.

Solution B.—37 parts of N-(acetylacetyl)-rosinamine dissolved in 216 parts of glacial acetic acid.

Solution B is introduced with vigorous stirring into 1000 parts of water at 20° C. containing in solution 3 parts of polyethoxylated dodecyl alcohol. A fine suspension is obtained, which is added over a period of 15 minutes to solution A, which is kept agitated. 64 parts of sodium hydroxide (in the form of a 5 N solution) are slowly added to the mixture thus obtained, kept at 20° C. and constantly stirred, then the solution of the diazo derivative of 3-nitro-4-amino-toluene is introduced in a period of two hours. The mixture is stirred for a further hour, while the temperature is gradually raised to 85° C. The yellow pigment which is formed is filtered off, washed and dried at 65° C. 355 parts of dry pigment are obtained.

When used in printing inks, this pigment has the same shade and the same colouring power as the pigment prepared with N-acetylacetaniline as the only coupling component (C.I. 11,680); but while the unmodified pigment gives dull prints, the modified pigment leads to brilliant prints.

*Example 2*

The diazo derivative and the solution of N-acetylacetaniline (solution A) of Example 1 are used. An emulsion of N-(acetylacetyl)-rosinamine is prepared as follows.

Emulsion B.—28.6 parts of Rosin Amine D (Hercules Powder Company) are dissolved in 800 parts of water at 70° C. with 7 parts of acetic acid and 1.5 parts of polyethoxylated dodecyl alcohol. The solution is brought to a temperature of 40° C. and 9.2 parts of diketene are added with vigorous stirring. N-(acetylacetyl)-rosinamine is thus obtained in the form of a milky emulsion.

60 parts of acetic acid (in the form of a 5 N solution) are added to solution A with stirring. The N-acetylacetaniline is precipitated in a suspended state. 200 parts of calcium carbonate are added, and then the emulsion B. To the mixture thus obtained and maintained at 5° C., are added, in a period of one hour, nine-tenths of the solution of the diazo derivative of 3-nitro-4-amino-toluene, then the temperature is raised to 40° C., for the addition of the last tenth. The mixture is finally heated to 85° C., then acidified by means of hydrochloric acid until an acid reaction to Congo red is obtained. The pigment is filtered off, washed and dried, 358 parts being obtained. This pigment has approximately the same characteristics as that of Example 1.

*Example 3*

The treatment described in Example 5 of French Patent No. 1,226,652 is applied to the pigment of Example 1. After filtration, the pigment of Example 1 is not dried, but suspended in 10,000 parts of water. A solution of resin soap prepared with 55 parts of colophony, 7.3 parts of sodium hydroxide and 700 parts of water is introduced into this well stirred suspension. After stirring for some minutes, a solution of 46 parts of zirconium oxychloride is added, and the mixture is stirred for one to two hours, and the pigment filtered off and dried.

421 parts of a yellow pigment are obtained, which is very brilliant in typographic printing, decidedly surpassing in this respect that of Example 1 and also more brilliant than the pigment of Example 5 of the French patent.

*Example 4*

126.5 parts of 3,3'-dichloro-4,4'-diamino-diphenyl are tetrazotized in the usual way with 146 parts of hydrochloric acid and 70 parts of sodium nitrite. On the other hand, the two following solutions are prepared.

Solution A.—158 parts of 1-phenyl-3-methyl-5-pyrazolone are dissolved in 3500 parts of water with 38 parts of sodium hydroxide.

Solution B.—45.6 parts of N-(2-hydroxy-3-naphthoyl)-rosinamine are dissolved in 200 parts by volume of denatured ethanol at 95° C. with 4 parts of sodium hydroxide.

Solution B is poured into 1000 parts of water, a fine suspension of the amide being obtained, which is mixed with solution A. To the well stirred mixture are added 140 parts of calcium carbonate, and then, while maintaining the temperature at 25° C., the solution of the tetrazo derivative is introduced in a period of two hours. Then hydrochloric acid is added until an acid reaction to Congo red is obtained, and the mixture is then heated at 95° C. for an hour. It is filtered, and the pigment washed and dried.

332 parts of an orange pigment are obtained, of which the shade and the colouring power are similar to that of the disazo dyestuff C.I. 21,119 prepared under the same conditions with phenylmethylpyrazolone as the only coupling component. But while the latter is dull and powdery in a typographic print, the pigment obtained according to the present example is very brilliant when used in this way.

*Example 5*

122 parts of 3,3'-dimethoxy-4,4'-diaminodiphenyl are tetrazotized in the usual way with 110 parts of hydrochloric acid and 70 parts of sodium nitrite.

On the other hand, the following suspensions of coupling components are prepared:

*Suspension A.*—192 parts of 1-acetylacetylamino-4-chlorobenzene are dissolved in 1500 parts of water with 48 parts of sodium hydroxide and 5 parts of a polyethoxylated dodecyl alcohol. The solution is made up to 7200 parts by volume with water and 78 parts of acetic acid (in the form of a 30% solution) are added with vigorous stirring. The arylide is thus precipitated in a state of fine suspension.

*Suspension B.*—28.6 parts of Rosin Amine D are dissolved in 800 parts of water with 6.3 parts of acetic acid and 3 parts of polyethoxylated dodecyl alcohol. 9.2 parts of diketene are added with vigorous stirring and a milky emulsion of N-(acetylacetyl)-rosimamine is obtained.

The suspensions A and B are mixed and a concentrated aqueous solution of 204 parts of crystalline sodium acetate is added. The solution of the tetrazo derivative is introduced into the mixture of coupling components, with stirring, in a period of three hours, then the pigment is filtered off, washed and dried. 354 parts of orange pigment are obtained.

When examined in typographic printing, this pigment is more yellowish than a control pigment prepared under the same conditions with 215 parts of 1-acetylacetylamino-4-chloro-benzene as the only coupling component. While the control pigment gives a dull print, the pigment prepared according to the present example gives a very brilliant print.

Example 6

The diazo derivative of Example 1 and the two following solutions are prepared:

*Solution A.*—130 parts of 2-hydroxy-naphthalene are dissolved in 1000 parts of water with 50 parts of sodium hydroxide and a solution of resin soap prepared from 4 parts of colophony is added. The whole is made up to 2000 parts by volume by the addition of water and 3 parts of a polyethoxylated dodecyl alcohol are added.

*Solution B.*—45.6 parts of N-(2-hydroxy-3-naphthoyl)-rosinamine are dissolved in 200 parts by volume of denatured ethanol at 95° C. with 5.6 parts of potassium hydroxide.

Solution B is made up to 2000 parts by volume by the addition of water. The amide is precipitated in a state of fine suspension, which is mixed with solution A. The mixture is introduced into 4000 parts of water containing 60 parts of hydrochloric acid, with vigorous agitation, in a period of 15 minutes. To the suspension of coupling compounds thus obtained are added, with stirring, 100 parts of calcium carbonate, then the solution of the diazo derivative of 3-nitro-4-amino-toluene is gradually introduced, in a period of an hour and a half, the temperature being maintained at 20° C. The mixture is then heated at 40° C. for 3 hours, then at 55° C. for one hour. The coupling then being finished, the product is acidified with 11 parts of hydrochloric acid (in the form of a 5 N solution), and the red pigment obtained is filtered off, washed and dried at 65° C., 330 parts are obtained.

When used in typographic or offset inks, this pigment has a shade very simiilar to that of the pure toluidine red prepared under the same conditions (C.I. 12,120). Nevertheless, the prints which it gives are not powdery like those of the latter and they have a certain gloss.

In order to accentuate the gloss, zirconyl resinate may be incorporated with the pigment according to the process of French Patent No. 1,226,652. For this purpose, the pigment composition of the preceding paragraph is not dried. After filtering, it is suspended in 8000 parts of water, and a solution of 64 parts of colophony in 800 parts of water with 8.6 parts of sodium hydroxide is added to this suspension. After homogenisation, 345 parts of a 10% solution of zirconium oxychloride are introduced in a period of 10 minutes. The mixture is stirred for a further hour, then the pigment is filtered off and dried. 405 parts of a red pigment are obtained, which is very glossy on printing, and distinctly superior not only to the preceding pigment, but also to the pure toluidine red in which the same proportion of zirconyl resinate has been incorporated.

Example 7

162 parts of 2,5-dichloro-aniline are diazotized in the usual way with 127 parts of hydrochloric acid and 70 parts of sodium nitrite. The solution of the diazo derivative is made up to 5000 parts by volume by addition of iced water. On the other hand, the following two solutions are prepared:

*Solution A.*—250 parts of N-(2-hydroxy-3-naphthoyl)-p-toluidine are dissolved in 6500 parts of water at 90° C. with 125 parts of sodium hydroxide. As soon as it has completely dissolved, this solution is cooled to 40° C.

*Solution B.*—45.6 parts of N-(2-hydroxy-3-naphthoyl)-rosinamine are dissolved in a mixture of 500 parts of water and 250 parts by volume of denatured ethanol, at a temperature of 70° C., with 14 parts of sodium hydroxide.

Solution B is introduced into solution A with vigorous stirring, and the formation of a white precipitate is observed. The mixture is then introduced into a well stirred solution of 500 parts of hydrated aluminium sulphate in 400 parts of water at 40° in a period of 15 minutes. To the suspension thus obtained, heated at 70° C., the solution of the diazo derivative of 2,5-dichloro-aniline is added gradually in a period of two and a half hours. When the coupling is finished, a solution of resin soap prepared with 103 parts of colophony, 13 parts of sodium hydroxide and 1200 parts of water is added. The mixture is further stirred for 30 minutes, then the pigment is filtered off, washed and dried, 562 parts of red pigment being obtained.

This pigment is compared as regards typographic printing with the pure pigment C.I. 12,440. The latter gives dull prints with bronze reflections whereas the pigment prepared according to the present example gives a much more vivid and very brilliant shade, without any bronzing. On the other hand, while having a similar shade and a colouring power approximately equal to the pigment prepared in an analogous manner but with the hydroxy-naphthoyl-p-toluidine as the only coupling compound (Example 5 of French Patent No. 1,246,922), it is more brilliant than this latter pigment.

Example 8

221.5 parts of 3-amino-6-chloro-toluene-4-sulphonic acid are diazotized in the usual way. The crystalline diazo derivative is filtered and suspended in 5000 parts of water at 5° C. On the other hand, the two following solutions are prepared.

*Solution A.*—137 parts of 2-hydroxy-naphthalene are dissolved in 1000 parts of water with 57 parts of sodium hydroxide. This solution is made up to 3000 parts by volume by addition of water.

*Solution B.*—22.8 parts of N-(2-hydroxy-3-naphthoyl)-rosinamine are dissolved in 100 parts by volume of denatured ethanol with 3 parts of sodium hydroxide.

Solution B is introduced into 2000 parts of water, a fine suspension of the amide being obtained, which is mixed with solution A. A solution of resin soap prepared from 50 parts of colophony, 6.3 parts of sodium hydroxide and 600 parts of water is added. To the mixture so obtained, well stirred at a temperature of 20° C., the suspension of the diazo derivative is added over a period of 30 minutes.

After stirring for two hours, the mixture is heated to 90° C., and a solution of 30 parts of ammonium chloride in 700 parts of water is added, and then a solution of 200 parts of hydrated barium chloride in 650 parts of water. After heating for a further hour at 90° C., the pigment is filtered off, washed and dried. 468 parts of red pigment are obtained.

It is compared as regards its typographic print with the control pigment prepared in the same way, but without N-(hydroxynaphthoyl)-rosinamine, and with the theoretical quantity of 2-hydroxy-naphthalene (C.I. 15,585). The control is bronzing, with a yellowish reflection. The pigment prepared as indicated above, not having this reflection, is of a more bluish and more vivid red.

*Example 9*

A suspension of the diazo derivative of Example 8 and the two following solutions are prepared:

*Solution A.*—130 parts of 2-hydroxy-naphthalene are dissolved in 1000 parts of water with 60 parts of sodium hydroxide. This solution is made up to 3000 parts by volume by addition of water.

*Solution B.*—47 parts of N-(1-phenyl-5-pyrazolone-3-carbonyl)-rosinamine are dissolved in 400 parts by volume of acetone.

Solution B is introduced in a period of 4 minutes into 3000 parts of water, with vigorous stirring. A brownish suspension of the amide is formed which is mixed with solution A. A solution of resin soap identical with that of Example 8 is added. To the mixture thus obtained, well stirred, is added in a period of 20 minutes at a temperature of 20° C., the suspension of the diazo derivative. The mixture is stirred for two hours, heated to 90° C., and solutions of ammonium chloride and barium chloride identical with those of Example 8 are successively added. Finally it is heated for an hour at 95° C. and the pigment is then filtered off, washed and dried. 472 parts of non-bronzing red pigment, similar to that of Example 8, are obtained.

*Example 10*

187 parts of 4-amino-3-toluene sulphonic acid, previously dissolved with 41 parts of sodium hydroxide, are diazotized in the usual way with 110 parts of hydrochloric acid and 70 parts of sodium nitrite. The suspension of the diazo derivative has a volume of 5880 parts. On the other hand, the two following solutions are prepared:

*Solution A.*—157 parts of 2-hydroxy-3-naphthoic acid are dissolved in 6000 parts of water with 1000 parts of 5 N ammonia and 59 parts of ammonium chloride. This solution is made up to 9000 parts by volume with iced water, and taken to a temperature of 10° C.

*Solution B.*—77.5 parts of N-(2-hydroxy-3-naphthoyl)-rosinamine are dissolved in 340 parts by volume of denatured ethanol, with 10 parts of sodium hydroxide.

Solution B is introduced into 2500 parts of water, and the suspension obtained is mixed with solution A. To the resulting mixture the suspension of the diazo derivative is added and vigorous stirring in a period of some minutes at a temperature of 10° C. Then a solution of 200 parts of calcium chloride is added, the mixture is heated at 95° C. for an hour, and the pigment filtered off and washed. It is dried at 65° C., 447 parts being obtained.

It is compared in typographic printing with a control pigment prepared in the same manner, but without N-(hydroxynaphthoyl) rosinamine, with 190 parts of 2-hydroxy-3-naphthoic acid (C.I. 15,850). The control gives a very dull, powdering and very bronzed red print. The pigment prepared as indicated in this example provides a non-powdering print with a satiny gloss.

*Example 11*

The process is as in the preceding example but with the difference that, instead of drying the pigment and filtering it, it is suspended in 15,000 parts of water containing 9 parts of acetic acid.

A solution of resin soap prepared with 110 parts of colophony, 14 parts of sodium hydroxide and 1300 parts of water is added. After homogenisation, a solution of 61 parts of hydrated zirconium oxychloride is added, stirring is continued for an hour, then the pigment is filtered off, washed and dried. 582 parts of a pigment giving a very brilliant print without any yellowish reflection and therefore much more bluish and more vivid than that of the pigment of Example 10, are obtained. This print is a magenta shade.

*Example 12*

456 parts of N-(2-hydroxy-3-naphthoyl)-rosinamine are dissolved in 2000 parts by volume of denatured ethanol at 95° C. with 56 parts of potassium hydroxide. This solution is introduced with stirring into 2000 parts of water containing 3 parts of a polyethoxylated dodecyl alcohol. A solution of 106 parts of sodium carbonate in 1000 parts of water is added. The suspension obtained is taken to 58° C. and, while maintaining this temperature, a solution of the diazo derivative prepared from 152 parts of 3-nitro-4-amino-toluene, identical with that of Example 1, is gradually introduced in a period of an hour and a half. The mixture is then acidified with 92 parts of hydrochloric acid. The red dyestuff is precipitated in a state of fine suspension. After filtering, washing and drying it at 45° C., 610 parts of dyestuff are obtained.

A mixture is prepared consisting of 10 parts of the azo derivative of rosinamide prepared above to 100 parts of the pigment C.I. 12,120. Although the pigment used alone gives powdering prints, the pigment mixture gives prints possessing a certain brilliance.

As shown by the foregoing, the modified azo pigments of the invention are formed by coupling the diazo compound with a mixture of coupling compounds, one of which is a rosinamide. It will be observed from the examples that the coupling compounds are present in substantially the molecular proportion necessary for complete reaction with the diazotized amine. Thus, as shown in Examples 1, 2 and 6, one mole of a diazotized monoamine is reacted with a total of about 1 mole of coupling components. Examples 4 and 5 illustrate that with diazotized diamines, one-half mole of diazotized diamine is reacted with a total of about 1 mole of coupling components. As has been previously pointed out and as shown in the examples, the mixture of coupling components is comprised of 95 to 85% of the first coupling component and 5 to 15% of the rosinamide, based on molecular proportions.

We claim:

That improvement in azo pigments obtained by coupling (1) the diazotization product of an amine selected from the group consisting of

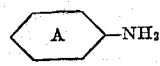

and

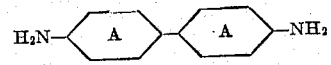

where the A nucleus of said amine is substituted by at least one member selected from the group consisting of hydrogen, chlorine, methyl, methoxy, nitro and sulpho, with (2) a first coupling component selected from the group consisting of the pyrazolone, 2-hydroxynaphthlene, 2-hydroxy-3-carboxy-naphthalene, N-(2-hydroxy-3-naphthoyl) amino-benzene, and N-acetyl-acetyl-amino-benzene series, wherein said azo pigment also comprises a material obtained by concurrently coupling (1) with (3), a second coupling component selected from the group consisting of the N-(acetylacetyl) rosinamines, the N-(2-hydroxy-3-naphthoyl) rosinamines, and the N - (1 - phenyl - 5 - pyrazolone - 3 - carbonyl) - rosinamines, the mole ratio of said first coupling component to said second coupling component being between 95 to 5 and 85 to 15.

References Cited by the Examiner

UNITED STATES PATENTS

| | | | |
|---|---|---|---|
| 2,319,969 | 5/1943 | Littman | 260—192 |
| 2,721,111 | 10/1955 | Long et al. | 260—163 X |
| 2,808,399 | 10/1957 | Dodson | 260—192 |
| 2,941,858 | 6/1960 | Forter et al. | 8—26 |
| 3,207,568 | 9/1965 | Lerch et al. | 8—26 |

TOBIAS E. LEVOW, *Primary Examiner.*

CHARLES B. PARKER, *Examiner.*

R. J. FINNEGAN, F. D. HIGEL, S. E. MOTT,
*Assistant Examiners.*